Dec. 26, 1961 H. GERBER 3,014,672

REEL INSERT

Filed Sept. 28, 1959 3 Sheets-Sheet 1

INVENTOR.
HOWARD GERBER
BY Charles A. McClure
ATTORNEY.

Dec. 26, 1961 H. GERBER 3,014,672

REEL INSERT

Filed Sept. 28, 1959 3 Sheets-Sheet 2

INVENTOR.
HOWARD GERBER

BY Charles A. McClure

ATTORNEY

Dec. 26, 1961

H. GERBER 3,014,672

REEL INSERT

Filed Sept. 28, 1959

3 Sheets-Sheet 3

INVENTOR.
HOWARD GERBER
BY Charles A. McClure
ATTORNEY.

United States Patent Office 3,014,672

Patented Dec. 26, 1961

3,014,672
REEL INSERT

Howard Gerber, Chester, Pa., assignor to Morris Martel, Havertown, Pa.

Filed Sept. 28, 1959, Ser. No. 842,801
2 Claims. (Cl. 242—55.18)

This invention relates to winding of web material, such as film, tape, or the like, concerning especially repeated unidirectional winding thereof without necessity of re-winding, together with means for accomplishing that purpose.

It is customary in showing motion pictures, for example, to unwind film from a reel upon which it is stored in spiral configuration, pass the film past the lens system of a projector, and then wind the film temporarily onto another reel from which it must be back-wound to bring the leading edge of the film to the outside of the spiral configuration. Such back-winding is normally a prerequisite to subsequent unwinding in the proper direction for showing the movie again. A similar back-winding problem occurs with single-track magnetic tape, for example, upon which impulses corresponding to music, pictures, or other intelligence have been stored, and the same is true of any funicular article having characteristics such that it is desirably run or scanned unidirectionally. For simplicity, all articles adapted to such an operation are denoted generally herein by the term "web" whether in the form of film, ribbon, tape, wire, or other funicular shape, and the term "film" is employed as a more specific example.

While means and methods are known for withdrawing a spirally wound web from the center of the spiral configuration, rather than in the customary manner from the outside thereof, the various devices for that purpose have not achieved significant commercial acceptance, especially in the instance of motion-picture projection. This is attributable at least in part to complexity in design and operation of such devices, leading to malfunctioning, maintenance problems, and increased costs—all in spite of the obvious desirability of eliminating the annoying and time-consuming back-winding operation, which itself is often deleterious to the film because of the increased speed usually employed and the accompanying abrasion, snagging, and whipping of the film.

A primary object of the present invention is improved procedure for unwinding a spirally wound web from the spiral configuration thereof and rewinding it into like spiral configuration without end-for-end reversal of the web. An object is enhanced procedural convenience in the unwinding of film from the center of a reel upon which it is wound in spiral configuration. A particular object is provision of reels with inserts adapted to facilitate performance of such a procedure. A further object is production of improved means for adapting movie reels with a minimum of expense to the unwinding of film from the center thereof rather than from the outside. Other objects of this invention, together with means and methods for attaining the various objects, will be apparent from the following description and the accompanying drawings.

Figure 1:
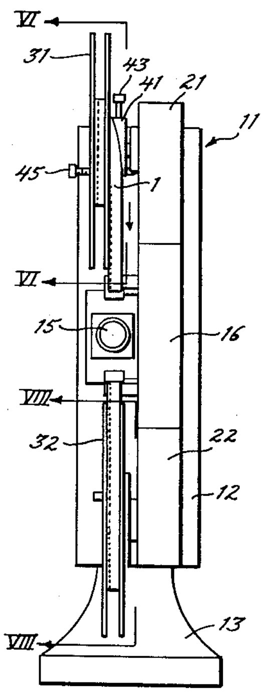
Figure 2:
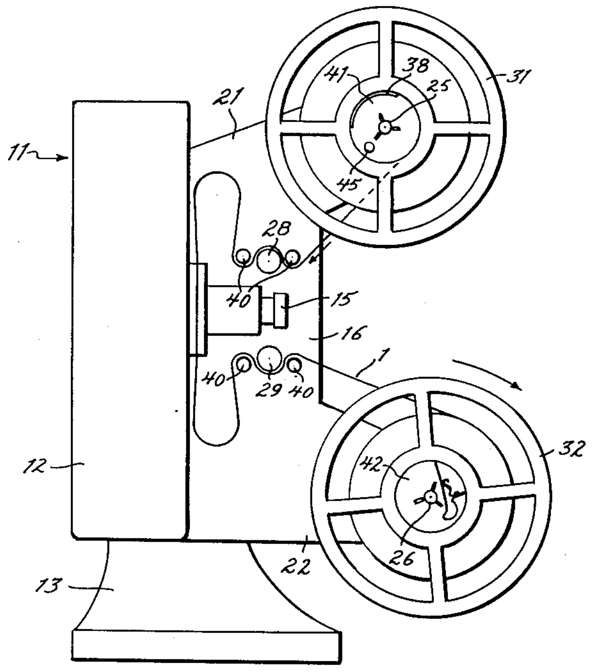
Figure 3:
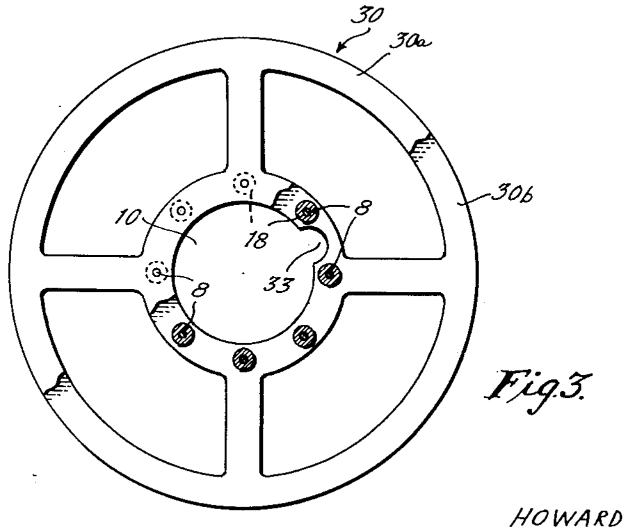
Figure 5:
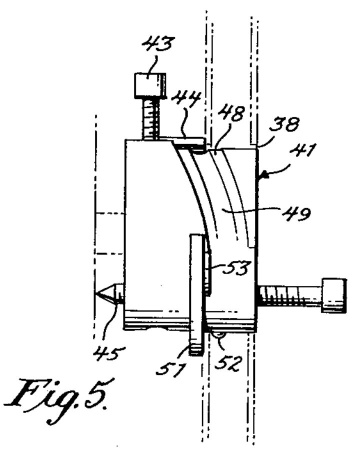
Figure 4:
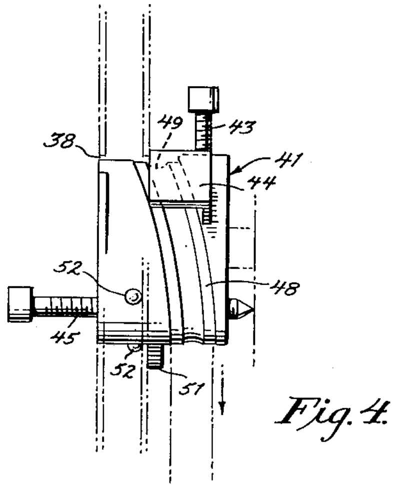
Figures 6, 6A, 6B:
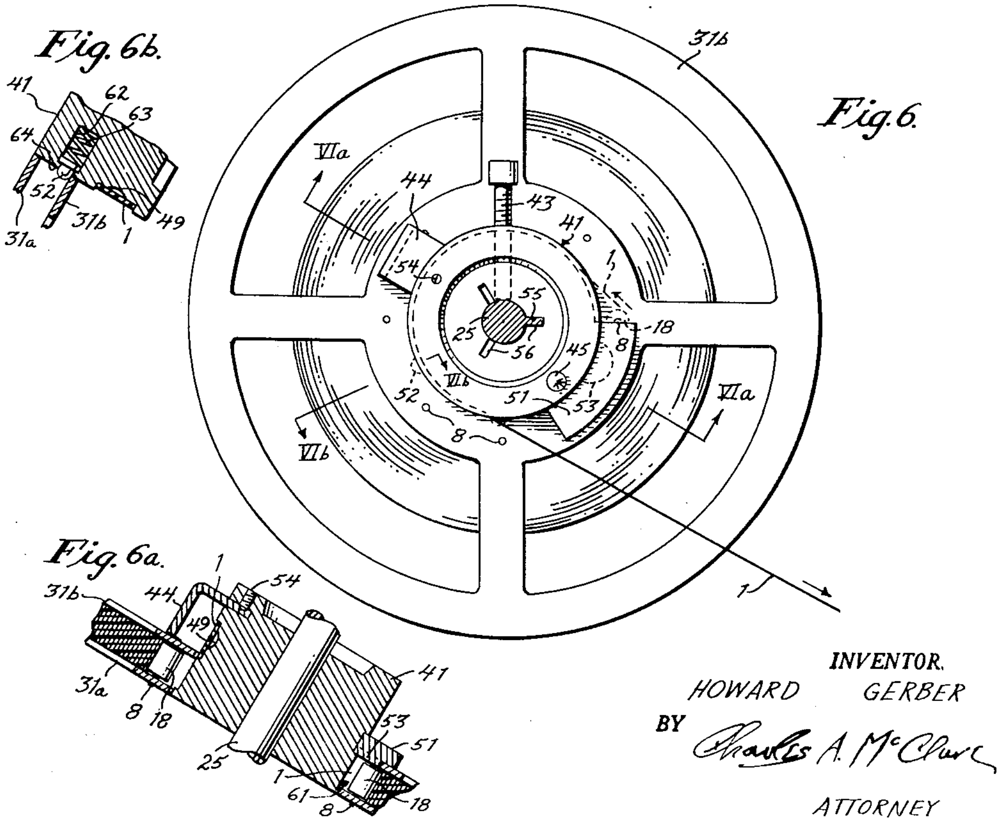
Figures 7, 8, 9, 10:
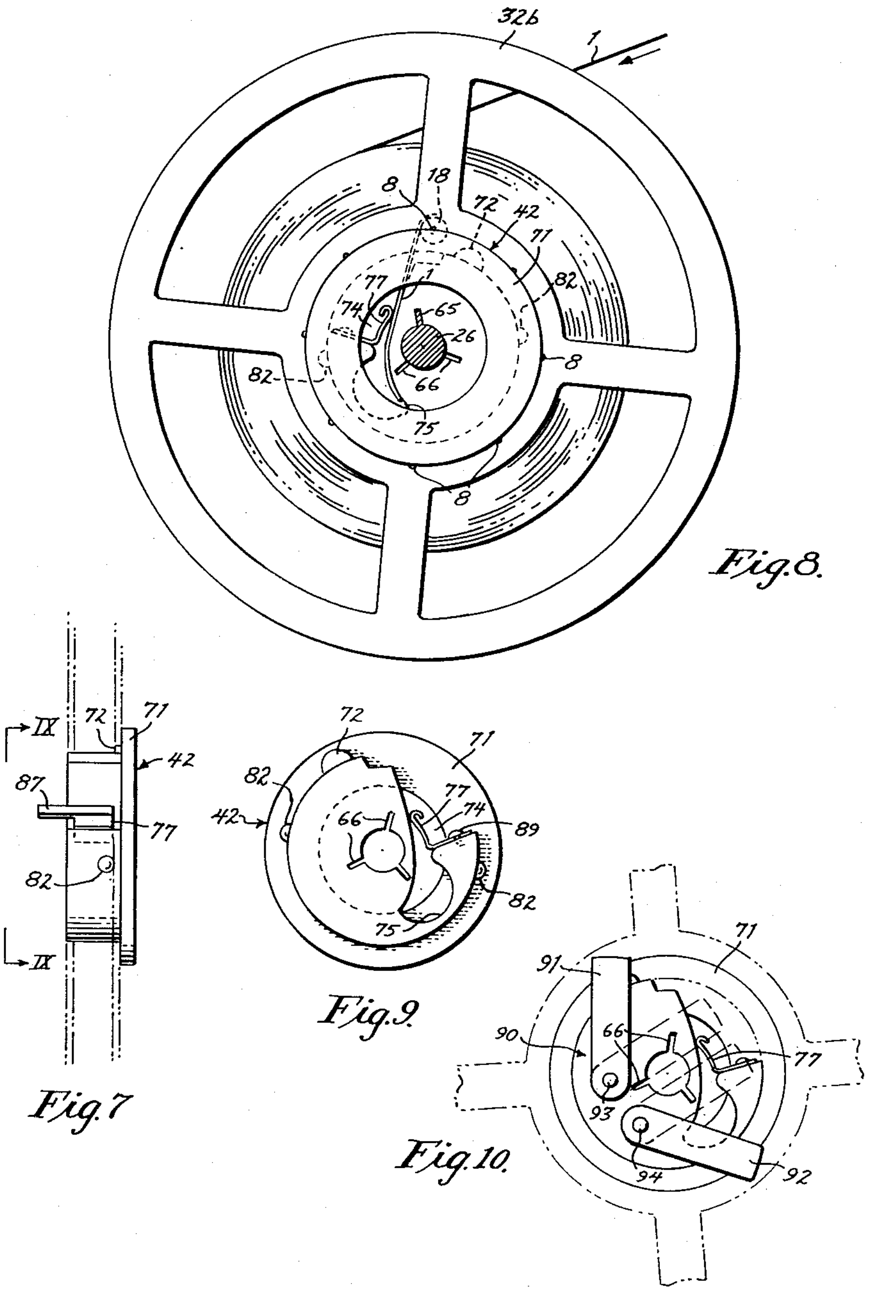

FIG. 1 is a front elevation of a motion-picture projector equipment with reels and associated apparatus according to the present invention; FIG. 2 is a side elevation of the apparatus of FIG. 1; FIG. 3 is a side elevation, partly broken away and partly in section, of a portion of the apparatus of the preceding general views; FIG. 4 is a front elevation of the adapter or insert for the upper or delivery reel (suggested here in phantom) conforming to the apparatus of the general views; FIG. 5 is a rear elevation of the apparatus of FIG. 4; FIG. 6 is a side elevation of the upper or delivery reel, including the apparatus of FIGS. 4 and 5, taken at VI—VI of FIG. 1 to show the side concealed in FIG. 2; FIGS. 6*a* and 6*b* are transverse sections of portions of the same apparatus, taken at VI*a*—VI*a* and VI*b*—VI*b* of FIG. 6. FIG. 7 is a front elevation of the adapter or insert for bottom reel (suggested here in phantom) conforming to the apparatus of the general views; FIG. 8 is a side elevation of the bottom reel, including the apparatus of FIG. 7, taken at VIII—VIII of FIG. 1 to show the side concealed in FIG. 2; FIG. 9 is a side elevation of the apparatus of FIG. 8, taken from the opposite side to show the adapter in more detail than in the general view, FIG. 2; and FIG. 10 is a side elevation of a modification of the apparatus of the immediately preceding views, shown from the same side as in FIG. 9.

In general, the objects of the present invention are accomplished, in a process of unwinding a spirally wound web in the same direction in which it was wound into the spiral configuration, by withdrawing the inner end of the web from the center of the spiral configuration substantially tangentially to the innermost wound layer and thereby simultaneously rotating the web to unwind the innermost layer continuously therefrom, also displacing the withdrawn portion of the web transversely by supporting it at the edges thereof along a helical pathway of substantially constant radius throughout and whose axis is substantially coincident with the axis of the spiral configuration, the helical pathway substantially terminating as soon as the transverse displacement of the web therealong equals the width of the web. The invention contemplates, as means for practicing this process, a reel for supporting the web in spiral configuration and having an open center, a substantially cylindrical insert fitting into the center of the reel, the insert having a surface thereof adapted to provide the helical pathway and extending in the axial direction outside the reel, and means operatively connected to both the reel and the insert and adapted to retain the insert fixedly in place with respect to the reel.

FIG. 1 shows from the front, and FIG. 2 from the right side, motion-picture projector 11 comprising generally housing 12 on base 13 and having lens system 15 located midway of the housing, with flange 16 at one side thereof. Carried on the flange are upper reel support 21 and lower reel support 22. Spindle 25 is mounted at the front on the upper support, while spindle 26 is mounted at the front on the lower support, both spindles extending horizontally to the right side of the projector (i.e., to the left in FIG. 1). The flange also carries top and bottom drive sprockets 28 and 29, respectively, each flanked by plurality of idler pulleys 40, and each driven by mechanism located inside the body of the projector as is wholly conventional (and, therefore, not shown or described further here).

Upper or top reel 31 is visible above and ahead of the lens, while lower or bottom reel 32 is located below and similarly ahead of the lens, each reel being located coaxial with its respective spindle. Film 1 is shown unwinding in the direction of the arrow from the top reel and winding onto the bottom reel. Each reel has associated with it an adapter or insert centered within and supporting it on the spindle, top and bottom adapters or inserts 41 and 42, respectively, carrying the respective reels. The reels themselves are identical, and each has an open center to receive the adapter or insert. Details of the reel construction are visible in the next view.

FIG. 3 shows, in elevation (partly cut away and in section), reel 30 useful according to the present invention, corresponding to both the top and bottom reels (previously designated specifically as 31 and 32) of the preceding views. The section is taken midway of pair of flat annular flanges 30*a*, 30*b* (only part of each one being visible in this view), each quadrant of which is skeletonized between the circular periphery and concentric inner edge, as is customary to save weight and material and to reveal the amount of film wound thereon. Semicircular indentation 33 appears in the inner edge of flange 30*b*. Pins 8 are spaced uniformly about the inner edge portion of the flanges with their ends swaged or otherwise rigidly interconnected thereto. Each pin has roller 18 rotatively carried on it between the flanges, the roller being slightly shorter than the transverse spacing of the flanges. It will be apparent that together the rollers constitute an inner support for film wound onto the reel, serving the purpose of a more conventional hub and also permitting the film to be withdrawn into open center 10 of the reel and then transversely out therefrom by means of the adapter or insert shown in previous views and revealed in greater detail in the next several views.

FIGS. 4 and 5 show upper or delivery adapter or insert 41 from the front (i.e., viewed in the same direction as in FIG. 1) and rear, respectively, but with the film removed and with the reel, spindle, and spindle-supporting arm fragmentarily indicated in phantom. The shape of the adapter or insert is generally cylindrical. It is bored not only to receive the spindle but also bored and threaded parallel and perpendicular thereto to receive two screws, as shown. Thumb screw 43 threads transversely (perpendicular to the axial bore) downward into the insert near its edge next to the spindle-supporting arm of the projector and into contact with the spindle, while thumb screw 45 threads longitudinally (parallel to the axial bore) through the insert and into contact with the projector arm. Helical pathway or track 48, with central groove-like recess 49, winds its way around the peripheral surface, beginning at the lower right in FIG. 5 and ending at the lower right in FIG. 4 (as suggested by the phantom representation of film and the accompanying arrow). It will be apparent that in the vicinity of the pathway the peripheral surface of the insert is nearer the axis (i.e., reduced in radius) slightly, as indicated at 38, which appears as an arcuate slot in FIG. 2; this facilitates escape of the film from the reel into the pathway, which will be discussed later.

Readily visible in FIG. 4 but nearly hidden in FIG. 5 is L-shaped bracket 44, which rises from the peripheral surface of the insert near the edge next to the projector arm, and extends at a right angle thereto into contact with the nearer flange of the reel and partly bridging the helical pathway. Flange 51 carrying semicylindrical boss 53 (which fits into the semicircular indentation of a reel flange, shown in FIG. 3) is visible in FIG. 5 along the left side of the reel next to the projector arm; only a portion of the flange is visible in FIG. 4, but FIG. 4 shows protruding ball detent 52, which rests against the inner edge of the reel flange contacted on its opposite or outer surface by the flange of the insert.

FIG. 6 and detailed sectional views *6a* and *6b* reveal further details of the construction of delivery adapter 41, together with the reel into which it fits and the supporting spindle. Spindle 25 has customary protrusion 55, which fits into one of three equidistant slots 56 in the bore of the insert, as shown in FIG. 6. Film 1 unwinding from the reel in the direction indicated by the arrow is shown in broken lines at the early part of its path, between rightmost roller 18 (also shown in broken lines) and the recessed pathway about the insert, and subsequently as a solid line. FIG. *6a* shows a medial transverse section of the insert and the closely associated parts of the reel, taken from upper left to lower right as indicated in FIG. 6. Two rollers are visible behind the plane of the section, with a multiplicity of layers of surrounding unwinding film also indicated. Film 1, with a specimen of sprocket holes 61, is visible passing from behind the roller at the lower right onto the pathway in the peripheral surface of the insert, as previously suggested. Boss 53 on flange 51 of the insert is engaged in the corresponding indentation in flange 31*b* of the reel. Shown threaded into the side of the insert so as to intersect the portion of the bracket recessed into the peripheral surface is set screw 54, which holds the bracket in place.

FIG. *6b* is a transverse section taken through the location of one ball detent 52 as indicated in FIG. 6. Generally cylindrical recess 62 receives compression spring 63 at the inner end, and ball detent 52 at the surface. The detent has a hemispherical surface protruding beyond the peripheral surface of the insert 41 and a flat cylindrical base resting against the spring. The width or diameter of the base is greater than that of the opening formed in annular surface layer or collar 64 of the insert surrounding the ball portion so as to retain the detent in place against the compression of the spring. Such collar configuration may be provided by leaving an excess of insert material in the vicinity of the recess (formed by drilling, for example), inserting the spring and the detent and holding them well toward the inner end of the recess, then swaging or upsetting the material to cover the base of the detent with collar-like layer 64 so formed, and leaving a smaller opening for the ball to emerge through; alternatively, a separate collar piece can be pressed or threaded into the bore after insertion of the spring and the ball detent. If desired, the recess can be bored first to the diameter of the ball and then counterbored (to a suitably larger diameter) from the opposite side of the insert, where it will be plugged after insertion of the detent followed by the spring. When the insert is in place in the reel, as shown in FIG. *6b*, the ball detent grips the inside edge of flange 31*b*.

Subsequent views show receiving adapter or insert 42 and its reel. FIG. 8 shows flange 32*b*, which is located nearer the projector arm, together with the insert in place in the otherwise open center of the reel. Flange 71 of the insert rests against the outer face of the mentioned flange of the reel and carries semicylindrical boss 72 (shown in broken lines), which fits into the semicircular indentation provided for such purpose, as previously shown. The generally cylindrical body of the insert lacks a segmental portion, leaving space 74 within the inner edge of the insert flange; the body has a hook-shaped portion outlining adjacent hollow 75. Attached to the terminal surface is leaf spring 77. The inner end of film 1 is shown pressed between the spring and the segmented surface and extending into hollow 74. The end portion of the film is shown in broken lines behind flange 71 and extending to and about roller 18, similarly shown. Spindle 26 has protrusion 65 registering in one of three equidistant slots 66 in the bore of the insert. Visible in broken lines are upper and lower ball detents 82, which are shown further in the immediately preceding and following views.

FIGS. 7 and 9 show, from the front and the same side as in FIG. 2 (opposite to that visible in FIG. 8), the receiving or lower adapter or insert. The reel is superimposed fragmentarily in phantom in FIG. 7, showing the position of ball detent 82 against the inside edge of the reel flange contacted on the opposite side by flange 71 of the insert. The free end of spring 77 has extension 87 to the left side in FIG. 7, which is the right side of the projector and its operator, in handy position to facilitate retraction of the spring from the segmented surface to permit insertion or removal of the film end, which is not shown in either of FIGS. 7 and 9. FIG. 9 shows the left side of the insert in greater detail, revealing screw 89, which attaches the base of spring 77 to the hooked portion of the segmented surface.

FIG. 10 shows, from the same side as FIG. 9, modified receiving insert 90, in which all the parts are the same as those of insert 42 (and are designated by the same reference numerals) except for substitution of flat leaf springs 91, 92, for pair of ball detents 82. Rivets 93, 94 retain the bases of these springs to the side of the insert and permit the free ends of the springs to be swung outward over the flange of the reel (suggested in phantom) to retain the insert in place. Flange 71 (shown in broken lines) bears against the opposite flange of the reel to cooperate with the retaining springs bearing against the nearer flange of the reel. Shown in phantom is the retracted alternate position of the leaf springs, in which they lie entirely within the open center of the reel, as is necessary to fit the insert into or remove it from the reel. Of course, such modified retaining means (or other equivalent means) may be employed in the delivery adapter, as well, although the previously illustrated detent means are preferred throughout.

The apparatus of this invention requires no special material or methods of production. The reels may be made conveniently of aluminum, steel, or other metals or of plastic or the like, and the adapter or inserts may be similarly composed. The reel flanges may be stamped out, forming apertures to receive the pins upon which the rollers are carried, and the pins with the rollers on them may be assembled to the flanges and retained in place by swaging the pin ends protruding through the apertures. The adapters or inserts may be formed by casting or molding, with boring and threading or other machining as indicated. If desired, the pathway in the described peripheral surface thereof may be formed by grinding or milling during or after construction of those parts, as will be apparent to one having ordinary skill in the art.

Operation of this apparatus is readily understood. Film or other web material may be wound onto the illustrated lower reel fitted with the receiving insert of this invention, being unwound from the illustrated reel fitted with a delivery insert of this invention or from any other suitable reel or unwinding device. The end of the film to be delivered is strung through the driving sprockets and past the lens system in the usual manner and then is passed between the flanges of the lower reel, after the insert has been snapped into place into the open center thereof with the semicylindrical boss engaging the semicircular indentation in the reel flange. Care is taken to ensure that the laterally protruding portion of the curved leaf spring extends to the right of the projector. Then the film end is passed over the roller toward which the free end of the spring points and is inserted between the spring and the segmented surface of the insert and optionally into the hollow beyond. This end is retained in place by the spring when released, and the reel may be given one or more turns if desired to cover the set of supporting rollers with a layer or two of the film. Actuation of the drive mechanism for the projector will advance the film in the usual manner and will cause the lower reel to rotate to wind it up. After completion of the winding, such receiving adapter may be removed merely by snapping it out, when the spring-loaded ball detents are employed as the retaining means, or after pivoting aside the alternate retaining means in the form of leaf springs. Of course, the spring retaining the end of the film is retracted to permit complete removal of the adapter, the film remaining in place on the reel.

When the delivery insert of this invention is employed, the inner end of the film is placed about one of the rollers and into the open center of the reel, where it already is found if the film has been wound onto the reel with the aid of the receiving adapter or insert just mentioned. In fitting the delivery insert to the reel, the operator holds the end of the film at the desired side (next to the projector arm, as illustrated) and then slips the delivery insert into the reel from that side, at the same time laying the film into the helical pathway or track. Of course, the semicylindrical boss on the insert flange must coincide with the semicircular indentation in the reel flange. The adapter or insert, with the reel in place on it, is then slid onto the upper spindle of the projector and is retained in place by threading one thumb screw against the spindle (which keeps the reel from sliding off the spindle) and threading the other thumb screw against the projector arm (which prevents the reel from turning on the spindle). The end of the film is then led in the usual order through the projector and is secured into the receiving insert in the lower reel as previously described.

In operation the transporting mechanism draws the inner layer of film from about the group of rollers in the top reel, and as the film follows the helical pathway it moves axially or transversely of the reel and the insert until it is outside the reel, whereupon it is free to pass through the projector and wind onto the lower reel as before. The trailing end of the film being wound off the delivery reel may be retained in place during its revolution about the reel (which remains stationary) by means of an elastic band or the like placed entirely about the reel between the flanges to contact the outer layer, or the end may be provided with a pressure-sensitive adhesive or other suitable means to retain it to the underlying film layer.

The advantage of not having to back-wind the film or other web material between runs has been mentioned and will be apparent. The reels accommodate either delivery or receiving adapters or inserts, as indicated, and also will accommodate a plain cylindrical insert (bored to receive the conventional spindle) if it is desired to use the reels in the conventional manner, i.e., with the leading edge of the wound film at the outside on the receiving reel. Minor modifications may be made in the means for orienting and retaining the adapters or inserts in the reels, or for retaining the end of the film on the receiving adapter or insert, without involving a departure from the claimed inventive concept. The inserts are readily fitted within and removed from the reels without disturbing the web material wound thereon, thereby greatly expediting the winding procedure. Other procedures and advantages, with or without modifications in the apparatus so used, will become apparent to those undertaking to practice this invention.

The claimed invention:

1. A snap-in insert for an open-center reel adapted to carry film, tape, or other web material in spiral configuration, the insert comprising a substantially cylindrical member having a web-supporting portion of maximum diameter approaching the inner diameter of the reel, the web-supporting portion extending helically outside the reel to one side thereof for a distance approximating the reel width, the insert having retaining means mounted thereon and adapted to cooperate with a portion of the reel to support the reel on the insert, including radially movable spring-biased means normally protruding beyond the web-supporting portion of the insert and adapted to be depressed substantially flush therewith when the insert is snapped into the reel.

2. The insert of claim 1 having a fragmentary flange affixed to the cylindrical surface thereof intermediate and parallel to the side edges thereof, the flange being adapted to abut the flange of a reel adapted to receive the insert, and having a part thereof adapted to key the insert non-rotatively to the reel.

References Cited in the file of this patent

UNITED STATES PATENTS

| | | |
|---|---|---|
| 1,276,054 | Grabe | Aug. 20, 1918 |
| 1,320,818 | Youngblood | Nov. 4, 1919 |
| 1,751,192 | Cowie | Mar. 18, 1930 |
| 2,044,569 | Hess | June 16, 1936 |
| 2,540,897 | Lindeman | Feb. 6, 1951 |
| 2,643,118 | Burson | June 23, 1953 |
| 2,670,202 | Gregg | Feb. 23, 1954 |